No. 630,142. Patented Aug. 1, 1899.
G. O. WALKUP.
SOD LINE MARKER.
(Application filed Jan. 31, 1899.)
(No Model.)
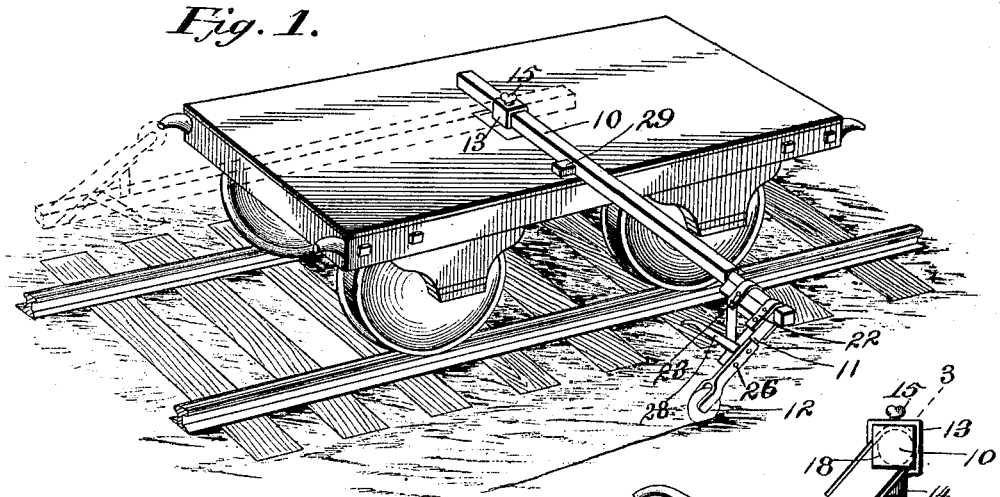
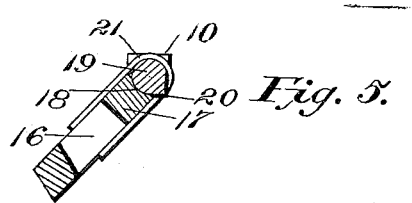
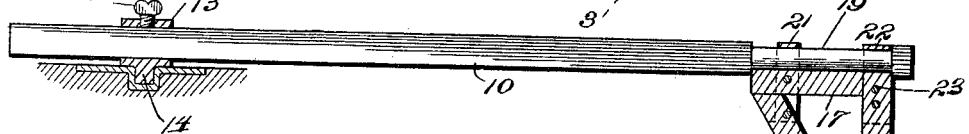
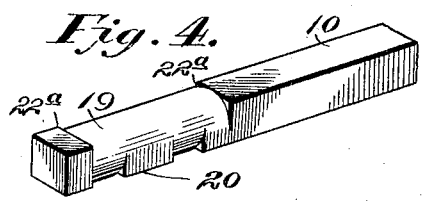
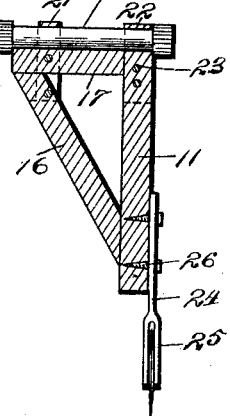
Witnesses
George O. Walkup, Inventor
By his Attorneys,

UNITED STATES PATENT OFFICE.

GEORGE OTIS WALKUP, OF RYAN, IOWA.

SOD-LINE MARKER.

SPECIFICATION forming part of Letters Patent No. 630,142, dated August 1, 1899.

Application filed January 31, 1899. Serial No. 704,011. (No model.)

*To all whom it may concern:*

Be it known that I, GEORGE OTIS WALKUP, a citizen of the United States, residing at Ryan, in the county of Delaware and State of Iowa, have invented a new and useful Sod-Line Marker, of which the following is a specification.

My invention is a sod-line marker for railway-tracks; and the prime object in view is to provide an implement which may be conveniently attached to an ordinary hand or push car, so as to be carried thereby and operated to denote the limit which the sod should be allowed to encroach upon the track.

In the maintenance or care of railway-tracks it is the common practice to stretch a rope adjacent to the track and to mark the sod-line with a shovel or other implement; but this method is objectionable, because it involves the expenditure of time and labor. To overcome this defect, I have provided an implement which may be fastened adjustably to a hand-car, so as to be projected any desired distance beyond one side of said car, and my implement is equipped with a rolling cutter adapted to penetrate the ground and to mark the sod-line as the car is moved along the track. My implement is also equipped with a hanger for the rolling cutter which is adapted to adjust itself to inequalities in the ground and to maintain said cutter in proper operative position at all times.

The invention further consists in the novel construction and arrangement of parts which will be hereinafter fully described and claimed.

To enable others to understand the invention, I have illustrated the preferred embodiment thereof in the accompanying drawings, forming a part of this specification, and in which—

Figure 1 is a perspective view of my implement applied to an ordinary flat or hand car, the view showing the implement in its working position in full lines and in its folded position by dotted lines. Fig. 2 is an end elevation of the implement detached from the car. Fig. 3 is a longitudinal sectional view on the plane indicated by the dotted line 3 3 of Fig. 2. Fig. 4 is a detail perspective view of the carrying-bar, illustrating the formation of the journal and stop thereon. Fig. 5 is a detail vertical section through the carrying-bar and hanger.

Like numerals of reference denote like and corresponding parts in each of the several figures of the drawings.

The sod-line marker of my invention consists of a carrying-bar 10, a hanger 11, and a rolling cutter 12, which is supported by the hanger and is sustained thereby in working position to the ground-line when the implement is in service. In its broad aspect the invention contemplates the employment of a hanger which is attached to the carrying-bar in a position to present the rolling cutter 12 to the ground; but as a subordinate feature of the invention this hanger 11 is mounted on or connected with the carrying-bar in a manner to move or rock thereon for the rolling cutter 12 to accommodate itself to inequalities or irregularities in the surface of the ground.

In applying the invention to an ordinary flat or hand car I employ a supporting band or cuff 13, adapted to receive the carrying-bar 10. Said band or cuff is provided with a pintle 14, which is fitted in a suitable socket in the floor of the car for the purpose of pivotally attaching the band or cuff and the carrying-bar 10 to the car, so that the implement may be folded to the dotted-line position shown by Fig. 1 when it is not in use. The cuff and the carrying-bar are angular in cross-section, preferably square, and the bar is clamped adjustably in the cuff by means of a set-screw 15, which finds a bearing in a threaded opening in the cuff and is adapted to bind against the carrying-bar.

The hanger 11 (illustrated in the accompanying drawings) is provided with a laterally-inclined strut or brace 16, one end of which is joined firmly to the hanger-bar at a point intermediate its length, and between the upper end of the hanger-bar and the strut is provided a bearing-block 17, which is secured firmly to said bar and strut. This bearing-block is formed with a concave face 18, which is adapted to fit snugly on the journal 19, provided at the outer end of the carrying-bar 10. In constructing the carrying-bar to form the journal I find it convenient to provide on the rear face of said bar a stop-shoulder 20, which protrudes beyond the circular outline of the journal 19 and lies in the path of the bearing-block 17 for the latter to impinge against the shoulder, and thereby limit or arrest the rocking adjustment of the hanger on the journal of the carrying-bar. This hanger is connected to the carrying-bar by means of the hinge-straps 21 22, formed, preferably, of metallic pieces bent into looped form and arranged to fit the cylindrical journal 19 and to overlap the hanger. The straps are secured firmly to the hanger by bolts or screws 23, and they are fitted loosely around the journal 19 to lie on opposite sides of the stop-shoulder 20, thus preventing endwise movement of the hanger on the carrying-bar. It will, furthermore, be observed that the formation of the cylindrical journal on the square carrying-bar provides shoulders 22ᵃ on the bar disposed at opposite ends of the journal, and against the shoulders ride the end of the bearing-block 17 and the hanger-bar, respectively.

The rolling cutter 12 may be connected to or mounted in the lower end of the swivel-hanger in any suitable way; but, as shown by the drawings, I prefer to employ a bracket 24, which is forked at its lower end, as at 25, to receive the cutter. This bracket 24 is applied laterally and secured firmly to the hanger by means of bolts, as at 26, and the rolling cutter 12 is journaled idly in said bracket on an axle 27, supported in the forked end 25. To keep the cutter to its working position I employ the handle or lever 28, which is fastened to the hanger at a point between the cutter and the hinge connection with the carrying-bar, said lever adapted to be grasped by the operator in order to depress the hanger and insure the cutter entering the ground.

To apply my implement to an ordinary car, as represented by Fig. 1, the pintle 14 of the cuff or band 13 is pivotally connected with the platform or floor of the car, preferably at or near the middle thereof. The carrying-bar is fitted in the cuff, and it is clamped or held in place by means of the set-screw 15. To use the implement, the carrying-bar and cuff are adjusted across the hand-car for the carrying-bar to lie substantially at right angles to the length of the track, and the swiveled hanger depends from the outer protruding end of said carrying-bar. The hanger is maintained in inclined position by its bearing-block 17 impinging against the stop-shoulder 20, and said hanger and the cutter are kept or depressed down to the ground-line by pressure applied to the lever of the hanger. After the parts shall have been adjusted as described the car is moved along the track in the direction indicated by the arrow, and the applied pressure on the handle or lever causes the rolling cutter to penetrate the sod and denote thereon the sod-line. The hanger is free to yield or give in an upward direction as the cutter traverses irregularities in the surface of the ground; but the pressure should be kept on the lever in order to force the hanger and cutter in a downward direction and insure the proper operation of the cutter. After the sod-line has been marked on the ground the implement may be adjusted out of the way by turning the carrying-bar and the cuff 13 on the pivot afforded by the pintle 14, and the implement may thus be adjusted to the inoperative position indicated by dotted lines in Fig. 1. If desired, however, the entire device may be detached from the car by lifting the pintle 14 of the band 13 out of its socket in the platform of the car.

To brace the carrying-bar 10 in its operative position, a suitable stop-shoulder 29 is provided upon the platform of the car, at or near one edge thereof. This stop-shoulder is adapted to engage the rear side of arm 10 and receive the strain thereon occasioned by the operation of the rolling cutter 12, and thus substantially brace the arm and relieve the pintle 14 of the greater part of the strain. A similar stop may be provided upon the opposite side of the platform, whereby the device may be used upon either side of the car.

Changes in the form, proportion, size, and the minor details of construction within the scope of the appended claims may be resorted to without departing from the spirit or sacrificing any of the advantages of this invention.

What I claim is—

1. A sod-line marker, consisting of the carrying-bar mounted to be pivotally adjusted on a vertical axis, a hanger pivotally supported by said bar and free to swing in a plane at right angles to the carrying-bar, and a rolling cutter connected to the hanger, substantially as described.

2. A sod-line marker consisting of a carrying-bar mounted to swing in a horizontal path, a rolling cutter connected pivotally and operatively with said bar and free to swing in a plane at right angles to the carrying-bar, and means for attaching the carrying-bar to a car and holding it rigid against vertical movement, substantially as described.

3. A sod-line marker consisting of a rigidly-held carrying-bar, means for permitting said bar to be swung horizontally through an approximate arc of ninety degrees, a rocking hanger mounted on said bar, a stop-shoulder in the path of said hanger to limit its movement in one direction, and a rolling cutter supported pivotally by the hanger, substantially as described.

4. A sod-line marker consisting of a rigidly-held carrying-bar, having a journal portion formed with an integral stop-shoulder and spaced lateral shoulders, a hanger loosely fitted to said journal and arranged to impinge against the stop-shoulder and held between the lateral shoulders, straps embracing the journal and secured firmly to the hanger, and a cutter supported pivotally by the hanger, substantially as described.

5. In a sod-line marker, the combination of a band having means for adjustably attaching the same to a car so as to turn on a vertical axis, a carrying-bar fitted in said band and adapted to be adjusted lengthwise therein, a clamp for holding said bar in its adjusted position in the band, and a cutter operatively connected with the carrying-bar, substantially as described.

6. A sod-line marker consisting of a carrying-bar, a hanger provided with a cutter and connected with said bar to rock or turn thereon, and a lever or handle operatively connected with the hanger, whereby the cutter may be kept in operative position, substantially as described.

7. In a sod-line marker, the combination of a carrying-bar adapted to be pivoted upon a car, a hanger supported by the bar, a cutter connected to the hanger, and a rigid stop-shoulder upon the car, the carrying-bar being adapted to engage the stop, and to be swung from a transverse to a longitudinal position, substantially as shown and described.

In testimony that I claim the foregoing as my own I have hereto affixed my signature in the presence of two witnesses.

GEORGE OTIS WALKUP.

Witnesses:
G. W. SHEPPARD,
S. S. SQUIRES.